US006782142B2

(12) United States Patent
Loce et al.

(10) Patent No.: US 6,782,142 B2
(45) Date of Patent: Aug. 24, 2004

(54) METHOD AND APPARATUS FOR USING ROTATABLE TEMPLATES WITHIN LOOK-UP TABLES TO ENHANCE IMAGE REPRODUCTION

(75) Inventors: Robert P. Loce, Webster, NY (US); Jeffrey D. Kingsley, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/187,924

(22) Filed: Jul. 1, 2002

(65) Prior Publication Data

US 2003/0002739 A1 Jan. 2, 2003

Related U.S. Application Data

(62) Division of application No. 09/221,285, filed on Dec. 23, 1998, now Pat. No. 6,438,273.

(51) Int. Cl.[7] .............................................. G06K 9/32
(52) U.S. Cl. ..................... 382/296; 382/209; 382/217; 382/289; 358/405; 345/537
(58) Field of Search ................................. 382/209, 215, 382/216, 217, 218, 219, 220, 278, 282, 287, 289, 293, 294, 295, 296, 297, 305, 291; 358/405, 406, 448, 450, 463, 465, 537, 538, 540, 488, 3.22, 3.23; 345/537, 543, 558, 566

(56) References Cited

U.S. PATENT DOCUMENTS

| 4,053,188 | A | * | 10/1977 | Jonner ......................... 303/174 |
| 4,267,573 | A | * | 5/1981 | Chaikin et al. ............. 382/296 |
| 4,272,818 | A | * | 6/1981 | McDaniel .................... 700/66 |
| 4,437,122 | A | | 3/1984 | Walsh et al. ................ 358/166 |
| 4,629,259 | A | * | 12/1986 | Brauninger .................. 303/174 |
| 4,825,366 | A | * | 4/1989 | Yamamoto et al. ........... 701/67 |
| 4,847,641 | A | * | 7/1989 | Tung ........................... 347/131 |
| 4,933,689 | A | | 6/1990 | Yoknis ........................ 346/154 |
| 5,005,139 | A | | 4/1991 | Tung ........................... 364/519 |

(List continued on next page.)

FOREIGN PATENT DOCUMENTS

| EP | 0 584 966 A1 | 3/1994 |
| EP | 0 592 775 A2 | 4/1994 |
| EP | 0 862 319 A1 | 9/1998 |

OTHER PUBLICATIONS

Torrey Pines Research, *Behind Hewlett–Packard's Patent on Resolution Enhancement™ Technology*, (Becky Colgan ed., BIS CAP International, 1990) pp. 1–60.

Robert P. Loce et al. in *Facilitation of Optimal Binary Morphological Filter Design via Structuring Element Libraries and Design Constraints*, Optical Engineering, vol. 31, No. 5, May 1992, pp. 1008–1025.

*Mathematical Morphology in Image Processing*, pp. 43–90 (Edward R. Dougherty ed., Marcel Dekker 1992).

Robert P. Loce and Edward R. Dougherty in *Spatial Resolution Conversion Using Paired Increasing Operators*, Enhancement and Restoration of Digital Documents, pp. 202–210, SPIE Optical Engineering Press, 1997.

*Primary Examiner*—Bhavesh M. Mehta
*Assistant Examiner*—Yosef Kassa
(74) *Attorney, Agent, or Firm*—William Eipert

(57) ABSTRACT

The present invention is a method and apparatus for improving the appearance of electronic images, and more specifically, to the efficient use of template rotation within a template matching process to enhance such images. The invention reduces the number of entries that are stored in a look up table by eliminating identical patterns that differ only by the angle at which they are output. The appropriate templates are then rotated it by the required angle for output subsequent to their retrieval from the lookup table.

17 Claims, 15 Drawing Sheets

U.S. PATENT DOCUMENTS

| | | | | |
|---|---|---|---|---|
| 5,237,646 A | * | 8/1993 | Bunce | 358/1.18 |
| 5,256,653 A | * | 10/1993 | Keppler et al. | 514/79 |
| 5,333,068 A | * | 7/1994 | Sakai et al. | 358/500 |
| 5,359,342 A | * | 10/1994 | Nakai et al. | 345/89 |
| 5,383,036 A | | 1/1995 | Mailloux et al. | 358/518 |
| 5,387,985 A | | 2/1995 | Loce et al. | 358/447 |
| 5,454,371 A | * | 10/1995 | Fenster et al. | 128/660.07 |
| 5,579,445 A | | 11/1996 | Loce et al. | 395/102 |
| 5,687,297 A | * | 11/1997 | Coonan et al. | 395/102 |
| 5,696,845 A | * | 12/1997 | Loce et al. | 382/254 |
| 5,742,703 A | * | 4/1998 | Lin et al. | 382/176 |
| 5,937,088 A | * | 8/1999 | Hsu | 382/167 |
| 6,021,256 A | * | 2/2000 | Ng et al. | 358/1.9 |
| 6,104,843 A | * | 8/2000 | Nakashima | 382/305 |
| 6,204,939 B1 | * | 3/2001 | Lin et al. | 358/518 |
| 6,223,192 B1 | * | 4/2001 | Oberman et al. | 708/270 |

\* cited by examiner

METHOD AND APPARATUS FOR USING ROTATABLE TEMPLATES WITHIN LOOK-UP TABLES TO ENHANCE IMAGE REPRODUCTION This application is a divisional of application Ser. No. 09/221,285, filed Dec. 23, 1998 now U.S. Pat. No. 6,438,273.

CROSS REFERENCE

The following related patents are hereby incorporated by reference for their teachings:

"Method and Apparatus for Modeling and Reconstructing Halftone Images" by Cuciurean-Zapan et al., U.S. Pat. No. 6,343,159 B1, filed Dec. 23, 1998;

"Systems and Methods for Designing Image Processing Templates" by Loce, U.S. Pat. No 6,381,372 B1, filed Dec. 30, 1998;

U.S. Pat. No. 6,389163 B1 entitled "Image Segmentation with Template Matching Filters," by Jodoin et al., filed Nov. 18, 1994 and assigned to the assignee of th present invention.

This invention relates generally to a method and apparatus for improving the appearance of printed documents, and more particularly to the efficient use of template rotation within a template matching process for the enhancement of digital images.

BACKGROUND OF THE INVENTION

Information systems for handling numerous document and data formats are moving towards becoming open systems where different devices are tied to one another to provide solutions to customers' needs. A key factor in such open systems is enabling an electronic document to be printed so that the customer does not perceive any difference between versions printed on different output devices. In order to achieve complete device-independence, efficient methods of accurately altering image resolution and enhancement are required to take advantage of the technology. Hence, raster conversion technology, where a bitmap created for a first output device is altered so as to be printable on a second output device, has become an important aspect of the open system technology.

Another important aspect is the preservation of the investment in technologies, while improving printers and print appearances. A common example for this case is the storage of fonts, forms, etc. in the form of bitmaps at a specified resolution, say 300×300 spots per inch (spi). With improving print engines, output resolutions of 600×600 spi, 300×1200 spi and the like are possible. However, existing applications using, for example, 300×300 spi fonts have to be handled by these new output devices at a quality level that exceeds that of the 300×300 spi output devices.

The present invention is a method and apparatus for efficiently processing digital image data to produce enhanced output images. Generally speaking, the invention employs resolution enhancement filters in the form of templates in look-up tables or logic operations. The invention may be used in design and implementation processes of template matching applications available in the art. Such applications include, but are not limited to resolution enhancement, appearance tuning, appearance matching, conversion to gray-scale (e.g., halftone de-screening), image restoration, pattern detection and segmentation.

Enhancement filters operate on image bitmaps to improve document appearance by converting from an original resolution to an output resolution of the printing or display device, at an integer multiple in each direction of the input resolution. The resulting image signals may then be used to drive devices at the output resolution without negatively impacting spatially sensitive features within the input image. In one embodiment, the present invention associates individual templates with multiple-bit per pixel, statistically generated look-up tables to reduce the number of look up tables that is required to improve the appearance of reproduced document images. The invention includes a technique for rotating templates about an axis, and using the original and flipped templates with a single multiple bit per pixel look up table to generate output signals that accurately represent the original image. The generated pixel image signals may then be used to drive output devices with higher fast-scan resolution or with output devices capable of printing multiple-bit per pixel output.

The present invention may be utilized to control a scanning beam where the beam varies in intensity and duration according to the pulses used to control it. For example, a laser beam may be used in a printer for selectively exposing areas on a photoreceptor. The latent electrostatic image formed on the photoreceptor by the beam exposure attracts developing toner, in proportion to the latent image charge level, to develop the image. As another example, a cathode ray tube uses an electron beam to scan a phosphorous screen. The electron beam may be varied in intensity and duration to accurately display information on the phosphor screen. In both examples, a pulse forming circuit responsive to the multiple-bit per pixel image signal may be used to generate video pulses to control the intensity and operation time of the respective beams.

In the preferred embodiment, the present invention will be used to efficiently implement template matching filters. These template matching filters will be designed by any of a number of methods, including but not limited to calculations that are based on geometry, statistics and expert knowledge of specific pattern shapes. One important aspect of the present invention allows multiple template filters that are intended for different portions of a pixel enhancement to be reduced to a single (or reduced number of) filter which may then be applied using efficient symmetry determination as disclosed in the present invention. For instance, in converting an image from a resolution of 300 spi to 600 spi, a single template matching filter could be used at various symmetries and each symmetry would generate one pixel of the four high resolution image pixels that is substituted for each input pixel.

In another aspect of the present invention, filtering may be applied to achieve a pixel that is not necessarily spatially divided into higher resolution sample. For example, such a filter may be used for activating or deactivating binary pixels in operations for enhancement operations such as thickening, thinning, or restoration. Yet another aspect of the present invention is use in converting binary pixels to gray-scale, as in the case of halftone de-screening, as well as in some forms of restoration and anti-aliasing. The present invention would efficiently implement multiple symmetries of a pattern as a single pattern within the template look-up table.

Still another aspect of the present invention may be used to enhance the design of template matching filters. The invention allows for more accurate statistical design by pooling data acquired that has been acquired for multiple symmetries of a pattern into the statistics of a single (or reduced number) of representative patterns. Those skilled in the art will recognize that the invention may be adapted for use with other filter design methods. For example, one member of a symmetry may be designed and the other templates may be derived from that designed pattern.

Previously, various methods and apparatus have been used to improve the quality of a reproduced image by using a template matching scheme in conjunction with a look up table. The following disclosures may be relevant to aspects of the invention:

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. Nos. 4,847,641 and 5,005,139 to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 4,933,689 to Yoknis describes a method for enhancing a displayed image in a laser exposed dot matrix format to produce softened edge contours. Using three pulses, a central pulse plus leading and trailing enhancement pulses that are separated therefrom. The purpose of the leading and trailing pulses is to create a blurred or grayed region at the leading and trailing edges of each associated character.

U.S. Pat. No. 5,237,646 to Bunce discloses a method for enhancing reproduction of pixel images includes the steps of: storing a raster scan bit map of an image; selecting an input window from the bit map image that includes a plurality of row segments of bits representing pixels, the input window having a center pixel bit; comparing a subset of bits in the input window (that includes the center pixel bit) with a plurality of prediction bit subsets, each prediction subset represented in a plurality of rotation orientations, and upon finding a match with one of the prediction bit subsets, rotating the input window to the degree and direction indicated by a command associated with a matching prediction subset (if any); comparing the rotated input window with a limited set of sample windows to determine a match of certain bit states within the rotated input window with certain bits of a stored sample window; and upon determining that such a match exists, substituting an enhanced pixel representation for the center pixel bit of the input window.

U.S. Pat. No. 5,383,036 to Mailloux et al. discloses a method for enhancing the contour fidelity of printed images of two or more colors, which includes obtaining a digital representation of the color image and finding color separations of each color. Each color separation is enhanced by a single set of inverse symmetrical templates, the set including templates in which the second template is always the inverse of the first, and the third and fourth templates are always 180 degree rotations of the first two. The resulting smoothed color separations are recombined into an enhanced image without separation error.

U.S. Pat. No. 5,387,985 to Loce et al. discloses a method and apparatus for converting the resolution of bitmap images, and more specifically, to the use of a template matching process to alter the resolution of digital images for printing or similar methods of rendition. The present invention uses statistically generated templates, implemented using look-up tables, to improve document appearance upon output by converting from an original or input spatial resolution to an output spatial resolution that is device dependent, and where there is a non-integer relationship between the input and output resolutions. The resulting image signals may then be utilized to control a scanning beam where the beam varies in intensity and duration according to the pulses used to control it.

U.S. Pat. No. 5,579,445 to Loce et al discloses a method and apparatus for automating the design of morphological or template-based filters for print quality enhancement. A plurality of different phase, but same resolution, subsampled images are generated from training documents. Statistical data derived therefrom is then employed in an automated process to generate filters. The filters may be used for resolution enhancement and/or conversion of bitmap images. Furthermore, the statistical data is used to produce filters that are intended to not only optimize image structure, but image density as well.

U.S. Pat. No. 5,696,845 to Loce et al. discloses a method and apparatus for improving the appearance of printed documents, and more specifically, to the use of a template matching process to enhance the fast-scan resolution of digital images while maintaining raster resolution for printing. The invention uses multiple-bit per pixel, statistically generated templates, implemented using look-up tables, to improve document appearance by converting from a single-bit per pixel to N-bits per pixel, while preserving raster resolution of the printed output. The resulting N-bit per pixel image signals may be utilized to control a scanning beam where the beam varies in intensity and duration according to the pulses used to control it.

A number of the previously described patents and publications are summarized in Torrey Pines Research, *Behind Hewlett-Packard's Patent on Resolution Enhancement*™ *Technology*, (Becky Colgan ed., BIS CAP International, 1990) pp. 1–60, including concepts associated with resolution enhancement.

Robert P. Loce et al. in *Facilitation of Optimal Binary Morphological Filter Design via Structuring Element Libraries and Design Constraints*, Optical Engineering, Vol. 31, No. 5, May 1992, pp. 1008–1025, incorporated herein by reference, describes three approaches to reducing the computational burden associated with digital morphological filter design. Although the resulting filter is sub-optimal, imposition of the constraints in a suitable manner results in little loss of performance in return for design tractability.

*Mathematical Morphology in Image Processing*, pp. 43–90 (Edward R. Dougherty ed., Marcel Dekker 1992), hereby incorporated by reference, describes efficient design strategies for the optimal binary digital morphological filter. A sub-optimal design methodology is investigated for binary filters in order to facilitate a computationally manageable design.

Robert P. Loce and Edward R. Dougherty in *Spatial Resolution Conversion Using Paired Increasing Operators*, Enhancement and Restoration of Digital Documents, pp. 202–210, SPIE Optical Engineering Press, 1997, hereby incorporated by reference, discloses a paired-erosion-based-filter architecture for performing the general image mappings required for optimal spatial resolution conversion. One member of the pair is an antiextensive operator while the other is extensive.

All of the above cited references are hereby incorporated by reference for their teachings.

SUMMARY OF THE INVENTION

In accordance with the present invention, there is provided a method of processing digital image data to produce enhanced output images, which includes the steps of: selecting a target pixel location in the bitmap image; observing a set of pixels within a pixel observation window superimposed on the bitmap image, relative to the target pixel location; generating an index pointer as a function of the pixel set by rotating the pixel set about an angle in a multi-dimensional space; using the index pointer, looking-up a code that defines the characteristics of a signal that will be used to output the target pixel; and rotating the signal about the pixel set angle in a three dimensional space and outputting the rotated signal.

In accordance with another aspect of the present invention, there is provided an electronic printing machine, which includes a raster exposure device; and an enhancement filter, connected to the raster exposure device, for performing pixel resolution enhancement on a bitmap image input thereto so as to produce a series digital signals to drive the raster exposure device, wherein the digital signals include a code that defines the characteristics of an output signal that will and an angle about which the output signal should be rotated in order to achieve pixel resolution enhancement.

In accordance with yet another aspect of the present invention, there is provided a method of reducing a number of entries stored in a look up table, wherein the look up table entries are associated with multiple output signals, including the steps of examining the look up table entries and the output signals, and reducing a number of output signals that will be generated based upon similarities between the look up table entries and the output signals.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 1:
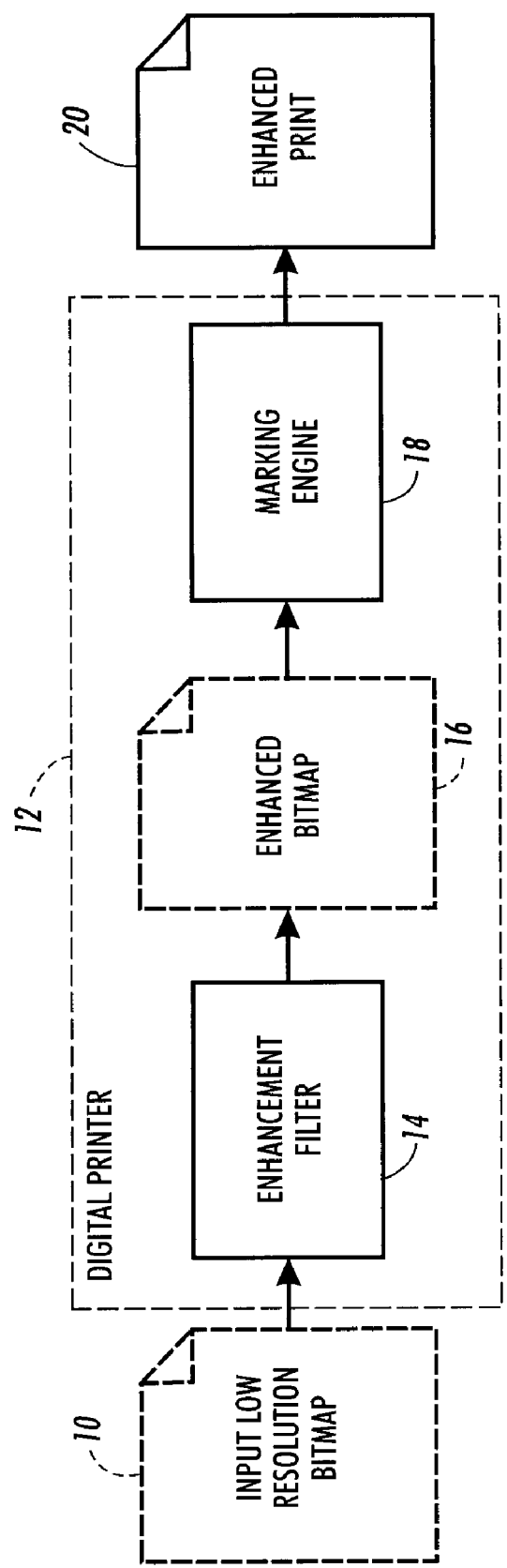
FIG. 1 is a block diagram of a digital printer embodiment employing the present invention.

FIG. 1 is a block diagram of a digital printer that illustrates a preferred embodiment of the present invention. As shown, a low resolution bitmap image 10 is presented to a digital printer 12 to produce printed output. Within the digital printer employing the present invention is enhancement filter 14 that transforms the input bitmap into an enhanced bitmap image 16. The enhanced bitmap image is then passed to marking engine 18 for exposure and development, as will be described with respect to FIG. 3, to produce enhanced output print 20.

Figure 2:
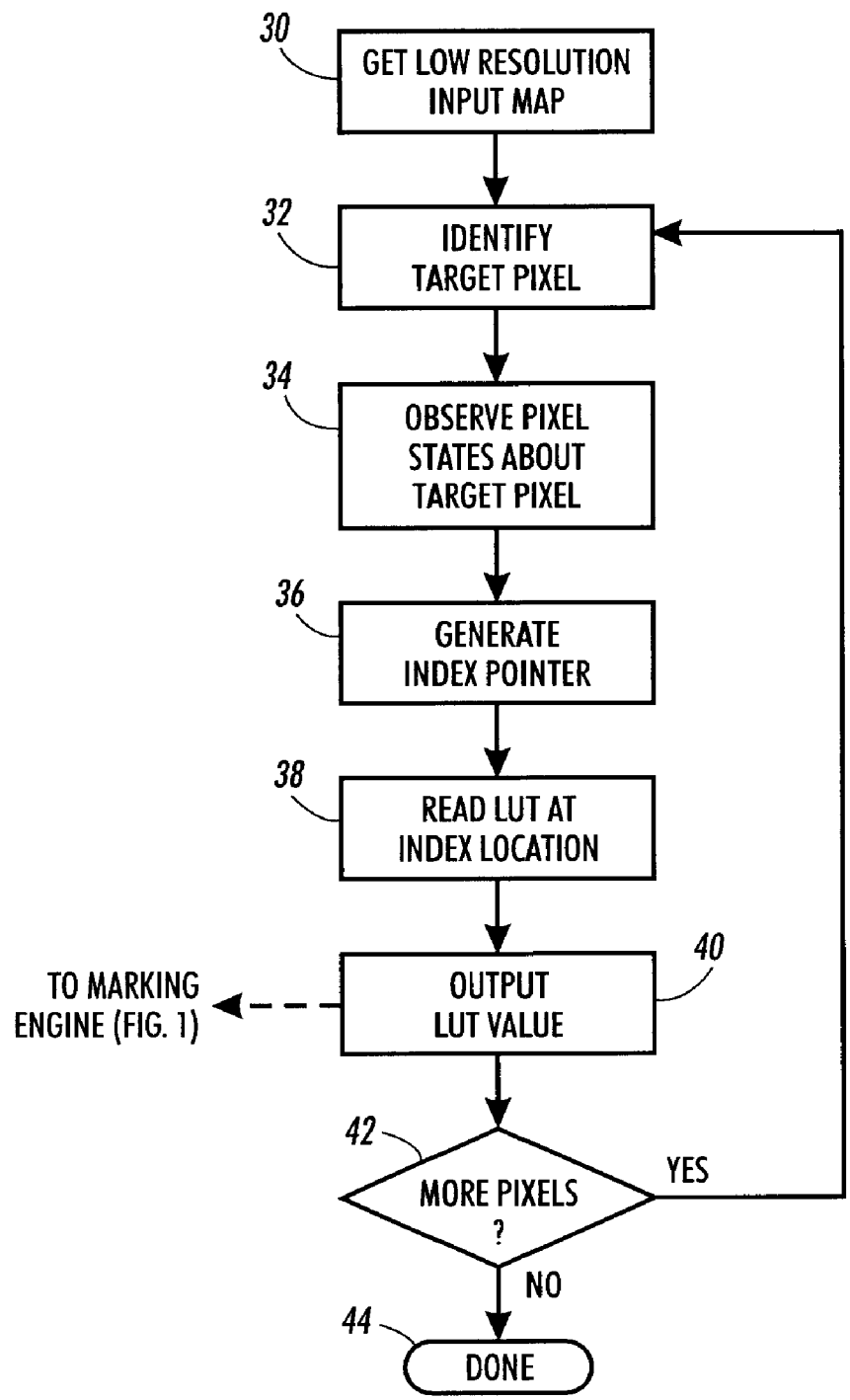
FIG. 2 is a flowchart illustrating the process steps necessary to accomplish image resolution enhancement in accordance with the present invention.
Figure 4:
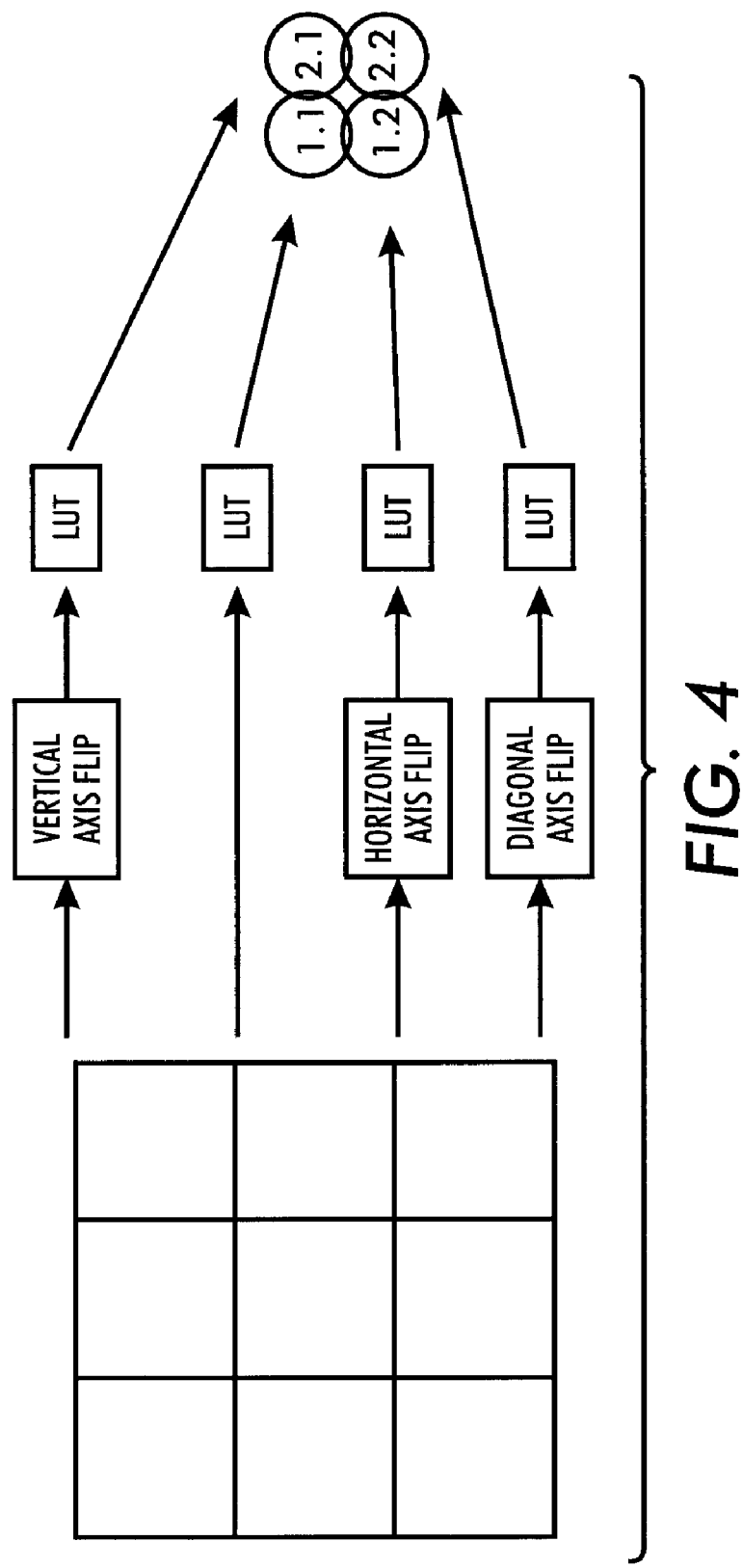
FIG. 4 illustrates how a 3×3 pixel window is converted from 300 spi to 600 spi using template rotation as disclosed in the present invention.

FIG. 2, in conjunction with FIG. 4, illustrates the operation of the image resolution enhancement filter represented by block 14 in FIG. 1. Beginning with step 30, the low resolution bitmap image 10 of FIG. 1 is retrieved. Next, a target pixel position is identified within the input bitmap at step 32. The target pixel position representing that pixel that is to be resolution enhanced by the following operations. At step 34, the "on" or "off" states (i.e., a binary input image in the present embodiment) of a set of pixels surrounding or in close proximity to the target pixel are observed through, what is termed "the pixel observation window." In a practical sense, the step of observing the pixel states is equivalent to retrieving the binary signal level for each pixel within the set of pixels. Moreover, the set of pixels is determined as a function of the design of the template-based filter as will be described below. An example of the manner in which a template based filter may be designed is described in detail in U.S. Pat. No. 5,724,455 to Eschbach, the relevant portions thereof being hereby incorporated by reference for their teachings.

Having observed the pixel states in the observation window about the target pixel, step 34, the states are used to generate an index pointer, for example a series of binary values stored in an address register, step 36. Once generated, the index pointer may then be used to access a location in a memory or look-up table (LUT), step 38. Most importantly, unlike template based filtering schemes in the prior art, present invention may operate successfully by accessing a template that is not an exact match to the pixel states in the observation window. Rather, the template matching operation is performed by examining multiple symmetries of a pattern. This allows for fewer templates to be provided to the image processing system, but allows image integrity to be maintained.

The image processing system in which the present invention is implemented will include a database of input patterns or templates at resolution M that may be used to generate output pixel patterns at resolution N. The structure or arrangement of the output pixels is one that is determined from the template database entry and a designated angle of rotation. In the following discussion the term "rotation" refers to angular displacement about an x, y, or z axis in a typical Cartesian coordinate system as well as about any axis that lies in the xy, yz or xz plane. Those skilled in the art will appreciate that in any case, the angle of rotation may be equal to zero degrees.

This approach has the advantage that only a small subset of all possible bitmap combinations of the input window will create a database entry, since the majority of possible bitmap combinations over a given window does not occur in standard documents. In manual systems, either all possible patterns have to be searched (e.g. 512 possible patterns for a 3×3 window, $2^{25}$ patterns for a 5×5 window, or $2^{49}$ patterns for a 7×7 window) or an expert guided reduction of the possible input patterns has to be performed. In prior art systems, a training technique is employed to design the templates to ensure that the templates in the database embody actual document instances to guide the input selection. However, many of these template matching methods require all of the templates in the database to be searched until an appropriate match is found. Other prior art template matching methods use hierarchical searching techniques, which enable a more efficient searching or indexing the template database. While implementing a hierarchical template matching scheme will typically eliminate the requirement of having to examine all templates in the database, efficient operation still requires a large number of templates to be provided.

High quality enhancements are commonly achieved through the use of multiple parallel template matching filters or morphological filters. The templates for each filter are stored in a look-up-table (LUT), and multiple LUTs are used to create the multiple filters. However, documents typically contain highly symmetrical image patterns. The present invention takes advantage of this fact, and discloses a technique for rotating templates about an axis, and using each rotated template with a single LUT. While practicing the present invention still requires searching the template database in a manner such as those previously described (i.e. searching all templates in the database or implementing a hierarchical template matching scheme) and, the number of templates that must be provided is substantially reduced with the inclusion of the ability to rotate the available templates about an axis, thereby enabling the system to operate as though a larger set of templates is present. This template rotation dramatically reduces the amount of search space and storage memory that would otherwise be required.

Figure 3:
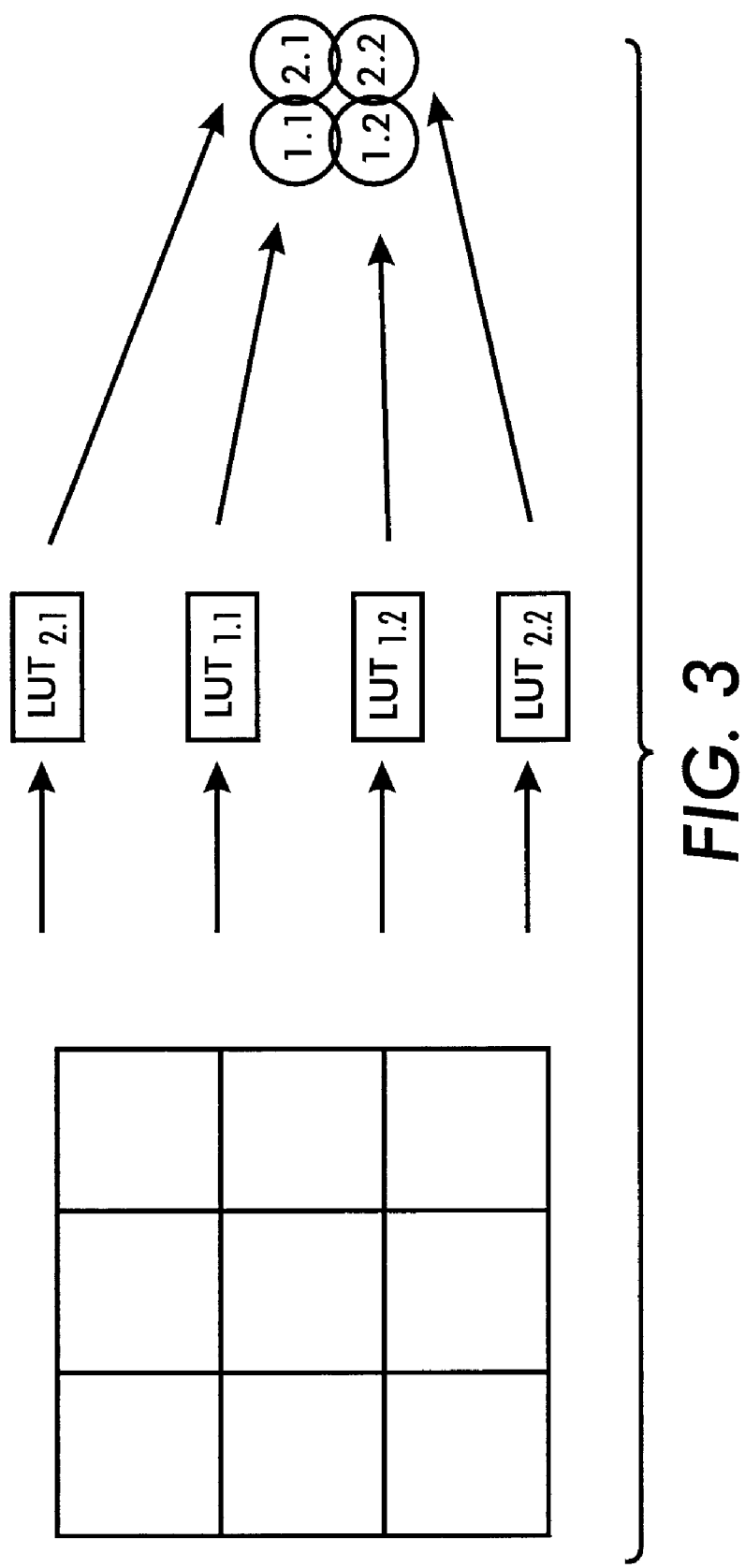
FIG. 3 illustrates how a 3×3 pixel window is converted from 300 spi to 600 spi according to prior art methods.

Turning to FIG. 3, an example of converting a 300 spot per inch (spi) input image to a 600 spi output image using a 3×3 window is provided. The 3×3 window of data is mapped through four LUTs to generate four pixels in the output image. These pixels will be centered about the location of the pixel in the original 3×3 window. The reference letters "i.j" refer to the sampling phase of the given output pixel. In the example provided, each pixel in the output image would be classified as belonging to one of the four sampling phases. The pair of numbers i.j refers to the pixel i in the scanline j (i.e. 2.1 refers to the second pixel in the first scanline). As before, templates that are stored in LUTs are designed using training techniques. For each LUT, the training is performed from the input image to its respective sampling phase of the output image ($LUT_{1.1}$ is designed from joint statistics of the input image and the 1.1 output image pixels.

Turning now to FIG. 4, the present invention discloses a template rotating technique and architecture that achieves the high quality of a multi LUT filter while only requiring the hardware memory and design effort of a single filter. Again by a "template rotating technique", it is meant that templates are subjected to an angular displacement about an x, y, or z axis as well as any axis that lies in the xy, yz or xz plane in a typical Cartesian coordinate system. As indicated in the illustration, in the present invention a single LUT is designed using a method similar to that which could be used to design $LUT_{1.1}$. The window of data is passed through the LUT to generate the 1.1 pixel, then the window is rotated about a vertical axis and passed through the same LUT to generate the 2.1 pixel. The widow is then rotated about a diagonal axis and passed through the LUT a third time to create the 2.2 pixel. Finally, the window is rotated about a horizontal axis and passed through the table a fourth time to generate pixel 1.2. It should be noted here that while rotation of the original has been described here in a stated order (i.e. original configuration, followed by vertical, diagonal and then horizontal) the invention does not require rotating the window exactly as described here.

Successful image reproduction results are obtained when using the present invention because of the approximate mirror and rotational symmetry of pattern enhancement required for digital documents. In an ideal pair of digital documents at different spatial sample resolutions (i.e. 300 spi, 600 spi) for a given window about a target pixel, a pattern can be observed in the 300 spi image and would correspond to a desired group of four pixels in the output image. If a rotated version of the input pattern is observed, a rotated version of the output group typically occurs in the output high resolution image. Therefore a filter to perform operations such as resolution conversion could employ symmetry to store only one output pattern for a collection of symmetries of input patterns, and the appropriate signals are rotated or mirrored so that the filter output is set to the correct symmetry.

Figure 5:
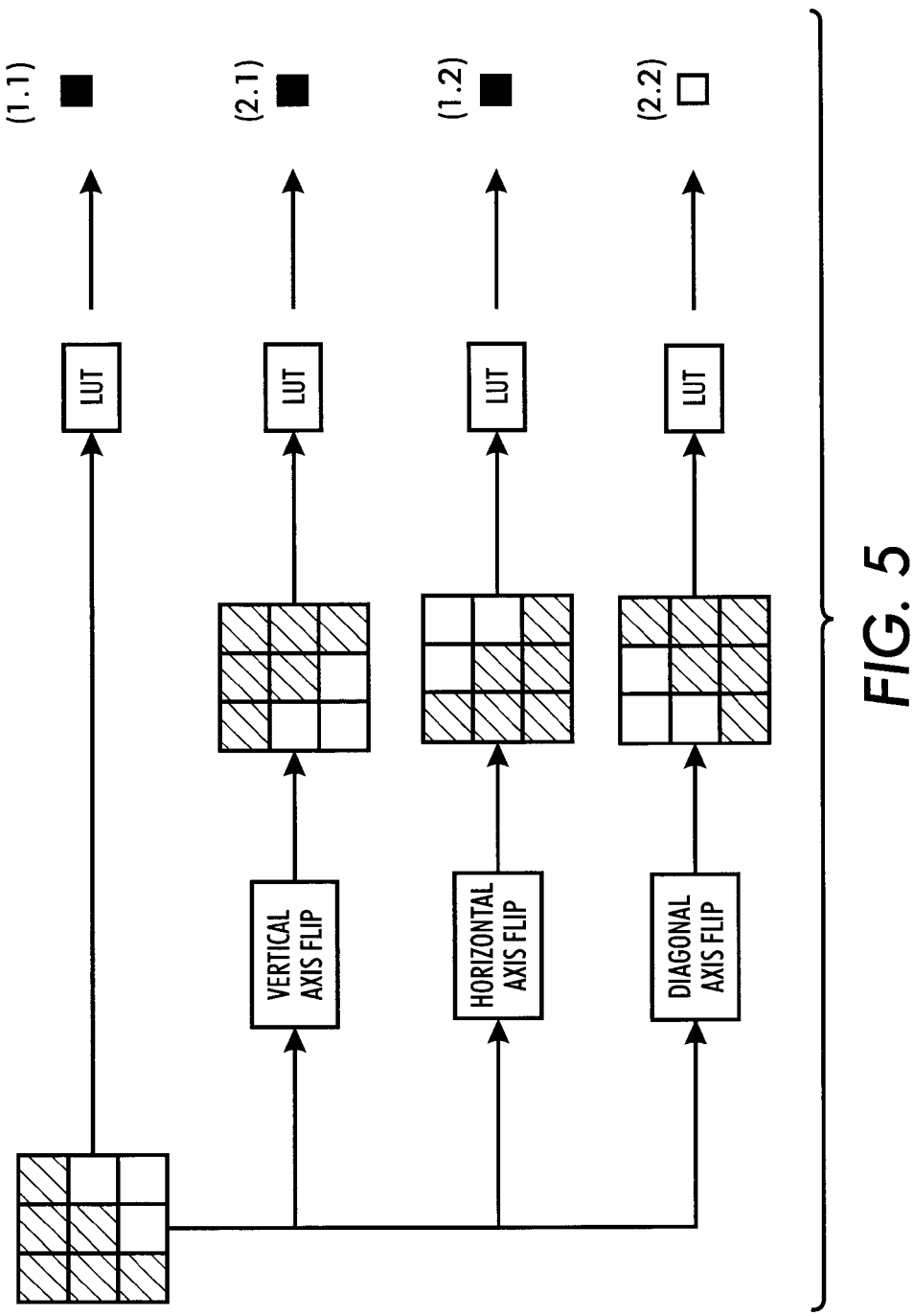
FIG. 5 contains a detailed illustration which shows operation of a template matching filter that incorporates the present invention.
Figure 6:
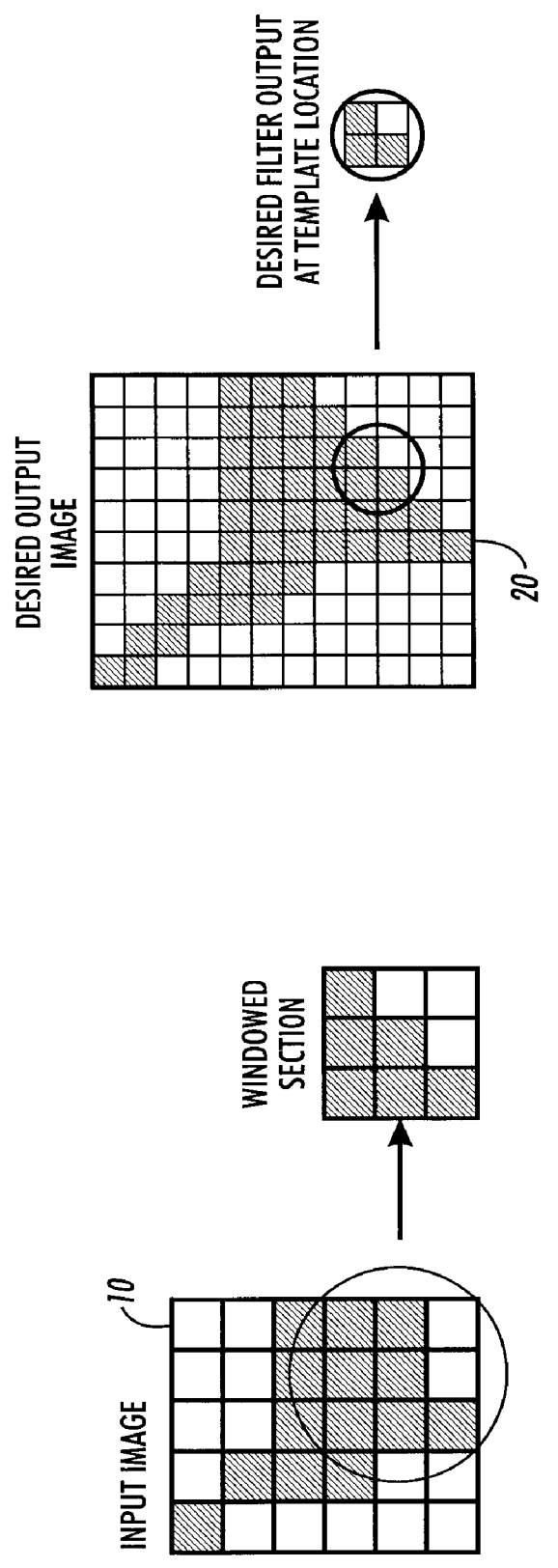
FIG. 6 shows the input image to which the filter of FIG. 5 is applied and the output image that results therefrom.

An example of the manner in which a filter that incorporates the present invention may operate is best illustrated in FIG. 5. The input image, portion of the image included in the window and the desired output image that correspond to the provided example are provided in FIG. 6.

In one embodiment of the invention, a single LUT is used and time delays are employed to allow one vector of nine bits to be input to the table at a given time. In another embodiment of the invention, four identical LUTs that use the template rotating technique described above are used in parallel.

In the embodiments of the invention described thus far, different symmetries of a template should result in corresponding symmetries in the output. In certain applications templates are used to generate output pixels signals that are not dependent on the symmetries of the input pattern. For example when template matching is used to segment text from halftones, all eight symmetries of a template occur in the LUTs because a given template will either fit in either text or in halftones regardless of the rotation angle or the axis about which rotation occurs. Thus, the templates used for segmentation need not be processed to yield output dependent upon particular symmetries. Similarly, when an image is enhanced from binary input to multiple bit per pixel output, if a pixel at a jagged edge should be turned to gray, this will generally occur regardless of symmetry. Thus, multiple symmetries of an input pattern could be associated with a single output signal.

One example of the mathematical operations that may be used to implement template rotation in accordance with the above described embodiments of the present invention are provided below.

Geometric operations which change window orientation without changing the locations of the pixels with respect to each other are referred to as "symmetry operations," because they retain the form of the image window but change the window in a symmetrical way. Common symmetry operations are:

| | |
|---|---|
| Flip Horizontal | flip the window about the horizontal axis |
| Flip Vertical | flip the window about the vertical axis |
| Flip Right Diagonal | flip the window about an axis from the upper left to the lower right |
| Flip Left Diagonal | flip the window about an axis from the upper right to the lower left |
| Rotate 90 | rotate 90 degrees clockwise |
| Rotate 180 | rotate 180 degrees clockwise |
| Rotate 270 | rotate 270 degrees clockwise |

Figure 9:
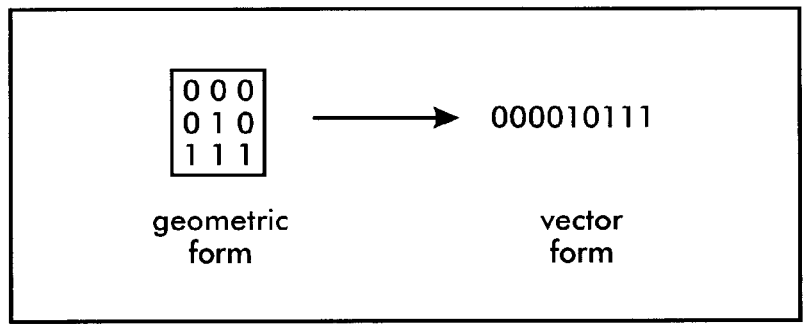
FIG. 9 shows an example of how a 3×3 window may be vectorized for use with the present invention.

The window from the image can be represented in either its original geometric layout or as a vector. The vector representation can be derived from its original geometric form by concatenating each of the scan lines of geometric shape into a single packed data structure. If the window has 32 or fewer elements, a 32 bit integer is conveniently used as the data structure. FIG. 9 shows how a 3×3 window may be vectorized for use with the present invention. Two calculation methods are provided in the following discussion. The non-vectorized method is used for the geometric form. It should be noted that these are binary images.

Implementation of Symmetry Operations on Vectorized Windows:

Given a single integer value, the intuitive method for software calculation of any of the symmetry options would be to mask or shift out each individual bit, then reorder the bits as a function of the operation, and finally recombine the bits into a single value.

A somewhat less compute intensive operation utilizes a look-up table. The table is initialized by calculating the result of the operation on any single bit position in the vector, entering the result into the table at the index that corresponds to that bit position. The symmetry operation can then be done on any given vector by summing the table values that are indexed by every location in the vector which has a value 1 pixel. Given the window shape, a table size can be calculated by the formula T=W*H (where T is the table length, W is the width of the window, and H is the height). In other words, the look-up table contains one entry for each pixel in the window.

Figure 10:
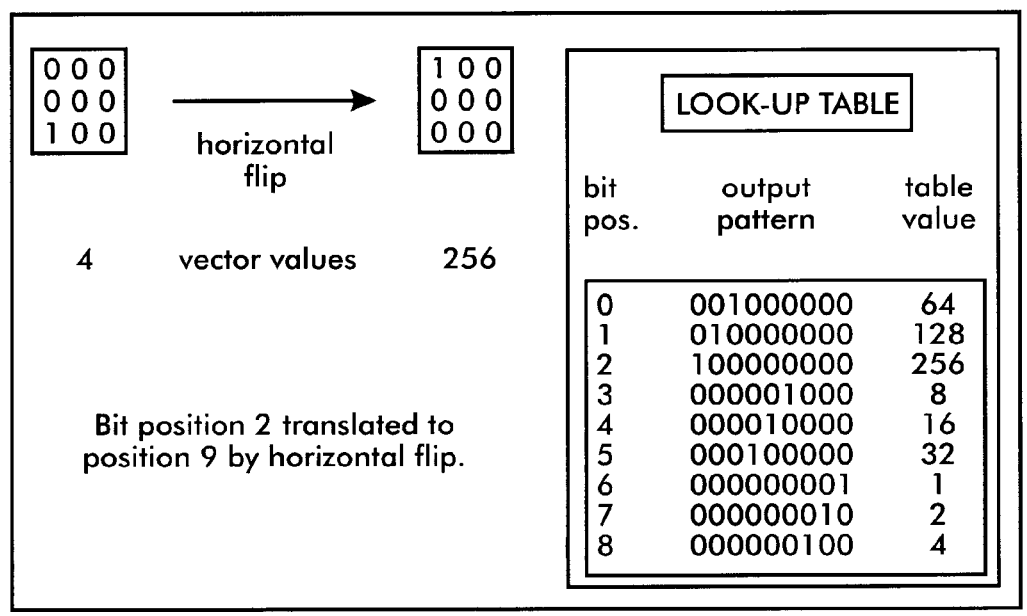
FIG. 10 shows an example of table pre-calculation.

A example of table pre-calculation is shown in FIG. 10. The window is 3 by 3 resulting in a look-up table with nine entries. Index 2 is being calculated for the operation of horizontal flip. The vector value of a bit in position 2 is 4. After the horizontal flip, the new vector value is 256. The value 256 is entered into the look-up table at location 2 (this assumes the least significant bit is 0). The look up table will differ for each of the symmetry operators listed above.

Figure 11:
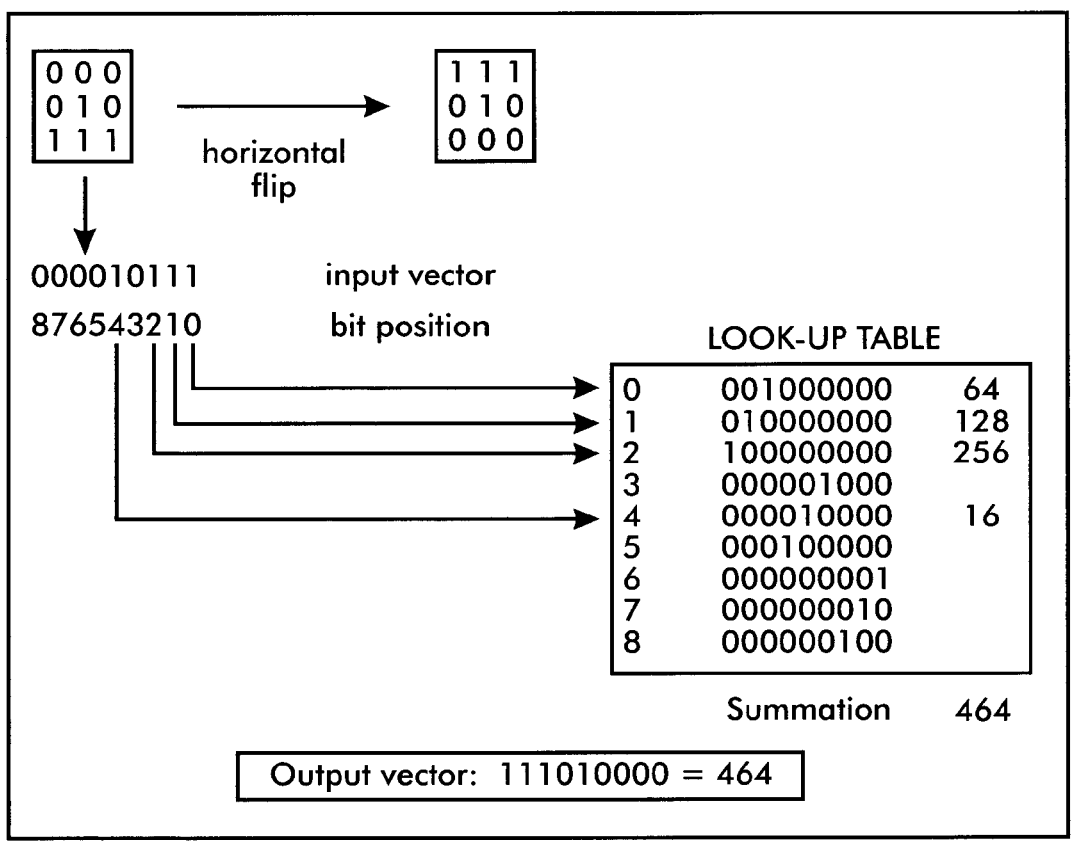
FIG. 11 illustrates an example of a symmetry operation on a given vector.

The symmetry operation can be performed on any given vector by separating a given vector into its individual bits. Each bit position that is set to 1 is used to index a value from the look-up table. The values from the look-up table are summed together resulting in the new vector. An example of this operation is shown in FIG. 11.

Hardware implementation of this operation is somewhat less complex than the software in the sense that each bit of the vector is present on a separate data line (binary image data). As a result the vector can be multiplexed to extract the data bits or each individual data line can be used as the input into a 1 by n chip where the number of outputs is equal to the window size. The output could be programmed with downloadable chips. Also any given operation could be hard wired.

Mathematical Descriptions of the Pixel Transforms

Each of the new locations for a given bit within the window can be specified by the equations in Table 1. The original location of the bit is given by the Cartesian coordinate pair (w,h), while the location after the operation is given by (W,h'). The other variables in the equations are H, the height of the window, and W, the width of the window. The subtraction of 1 is needed since w and h are indexed from 0 while W and H are maximum values.

Notice that the two diagonal operators are actually a combination of other operators. Flip right diagonal is a the combination of a rotate 90 and a horizontal flip. Flip left diagonal is a combination of rotate 90 and a vertical flip assuming the window is square.

TABLE 1

Coordinate Calculation Equations

| Operator | w' | h' |
|---|---|---|
| flip horizontal | W − w − 1 | h |
| flip vertical | w | H − h − 1 |
| flip diagonal left | H − h − 1 | H − w − 1 |
| flip diagonal right | h | w |
| rotate 90 | H − h − 1 | w |
| rotate 180 | W − w − 1 | H − h − 1 |
| rotate 270 | h | W − w − 1 |

In still another embodiment of the invention, only one of the symmetries—hereinafter referred to as the least common symmetry (LCS) is employed. This includes a template symmetry reduction scheme and filtering architecture that achieves small LUTs that have the same high quality performance as a much larger LUT filter. Templates can be "vectorized"—encoded into a string of binary variables (which can be thought of as a binary number with an associated decimal number) and referenced according to the associated decimal value. While many templates do not possess eight unique symmetries, various symmetries of a given template usually possess different number values.

Figure 7:
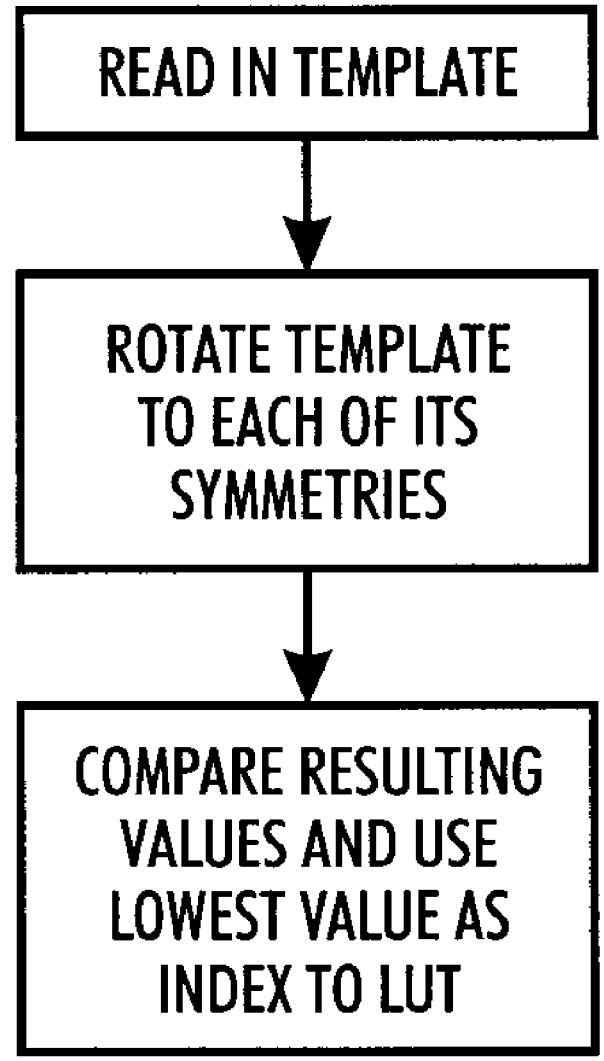
FIG. 7 is a flowchart that describes generally the steps required to rotate templates according to an embodiment of the present invention.
Figure 8:
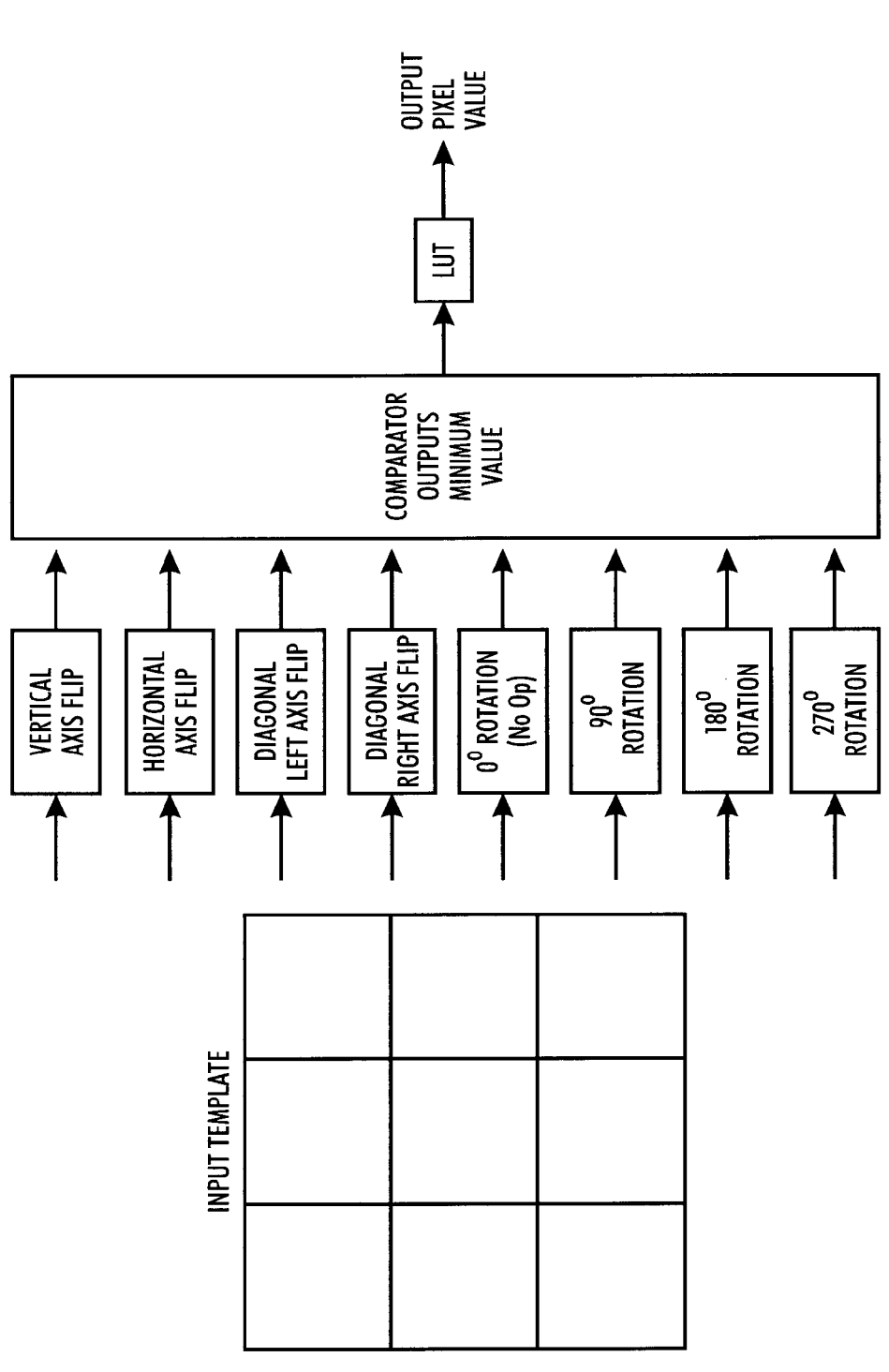
FIG. 8 is a schematic block diagram of a filtering process according to embodiment of the present invention.

In the embodiment of the invention described herein, only the LCS is stored to represent a symmetry group of templates within a LUT. Representing a group of templates using a single number allows for further significant storage savings. Turning now to FIG. 7 for a brief description of template rotation according to this embodiment of the invention, a template is read in from an input image and rotated to each of its eight symmetries. The eight binary or decimal values resulting from this step will be compared, and the lowest value is used s an index to the LUT. A schematic diagram of this filtering process is provided in FIG. 8.

Examples of mathematical operations that may be used to implement template rotation in accordance with LCS embodiments of the invention just described are provided below.

Finding the Least Common Symmetry:

The least common symmetry (LCS) is the vector that has the lowest ordinal value when a given vector is operated on by the full set or a subset of the symmetry operators. Table 2 lists the results of the entire set of operators on a 3×3 window which has only position 2 set (i.e. vector 000000100=4). Note that the LCS is 1. LCS can be found by calculating all possible values for a given vector, then selecting the minimum value. This requires extraction of each of the bits, many look-ups in the operator look-up tables (T times the number of operators), a summation for each operator, then selection of the minimum value.

TABLE 2

Calculation of LCS

| Operator | Result |
|---|---|
| flip horizontal | 256 |
| flip vertical | 1 |
| flip diagonal left | 4 |
| flip diagonal right | 64 |
| rotate 90 | 1 |
| rotate 180 | 64 |
| rotate 270 | 256 |

One possible alternative to this process is to pre-calculate of all possible input vectors, using a look-up table to find the LCS. This becomes impractical as the number of pixel in the window grows since the size of table is $2^n$, where n is the number of pixels in the window.

It should be noted that the Least Common Symmetry is used here as a reference for a collection of symmetric patterns. Equivalent alternatives do exist and are an aspect of the present invention. One example of such an equivalent is the Greatest Common Symmetry (GCS). The greatest common symmetry (GCS) is the vector that has the highest ordinal value when a given vector is operated on by the full set or a subset of the symmetry operators.

Figure 12:
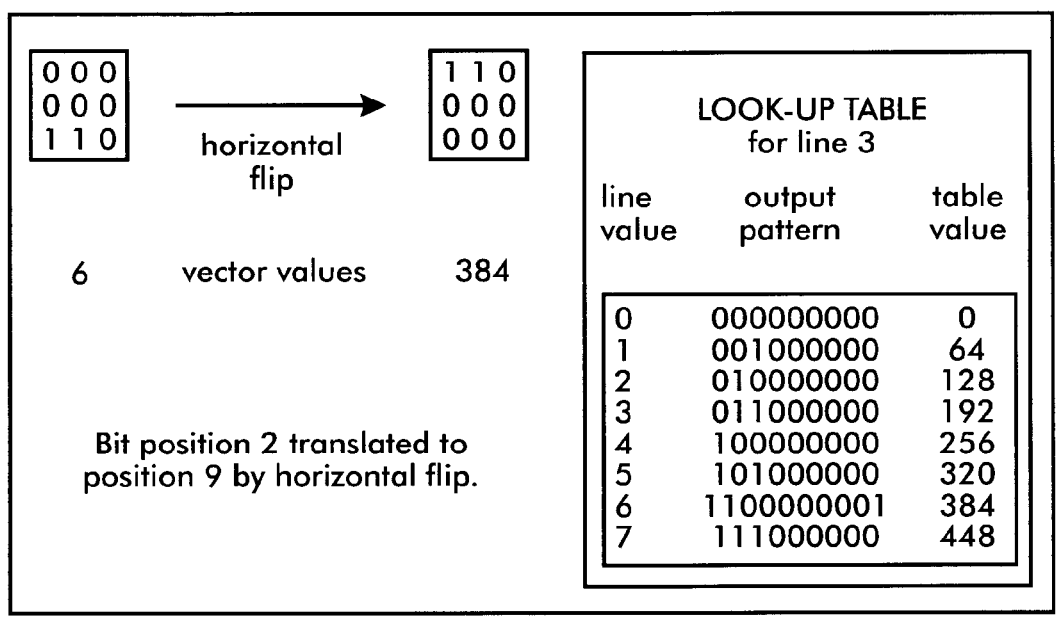
FIG. 12 shows an example of the calculation of a look-up table for a scan line.

Non-vectorized Calculation of Symmetry Operators:

Processing a vectorized window requires that each pixel be extracted from the vector in order that the appropriate table values are summed. Another method can be considered which avoids this step but requires additional table memory. If each scan line of the original window is used as an index into the look-up table, the entire scan line can be transformed in one step, thus avoiding extraction of single bits from the vector. A formula that calculates the needed table size is $T=2^{W*H}$ (where T is the table width, W is the width of the window and H is its height.) FIG. 12 shows the calculation of the look-up table for of one of the three scan lines (scan line 3) for the operation of horizontal flip on a 3 by 3 window. Notice that there are $2^{W*h}$ entries for each scan line. Since the operation of horizontal flip keeps the bits in the same order, the input bit pattern specified by the line value can be seen within the vector, but it has been migrated to a new location. Not all of the operations will retain the bit ordering. For example, vertical flip will result in the bits being scattered within the new vector.

Figure 13:
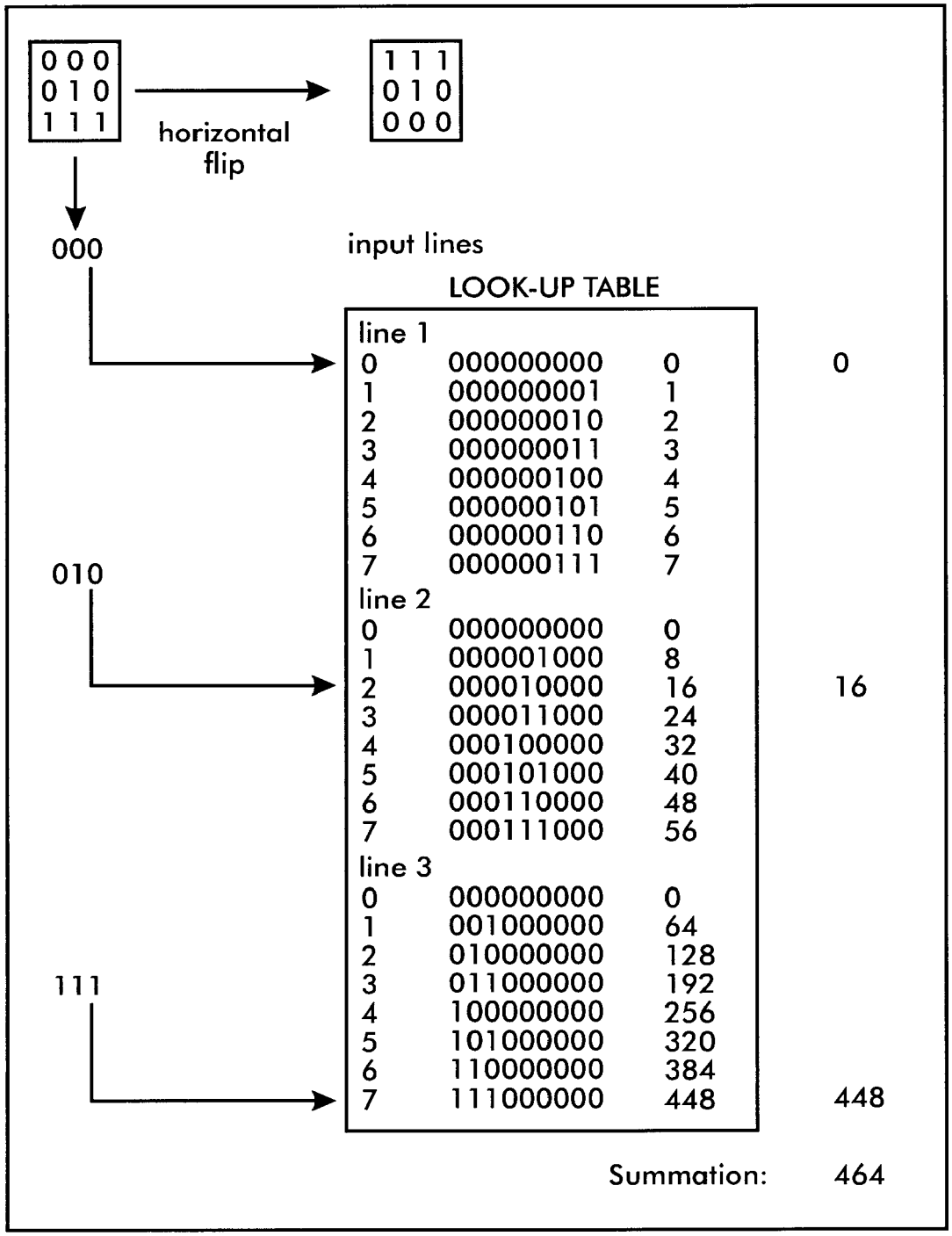
FIG. 13 illustrates an example of the symmetry operation of FIG. 11 performed using a non-vector method.

The example in FIG. 11 is repeated in FIG. 13 using the non-vector method. Each scan line within the window indexes a value from the table. The three values are summed resulting in the new vector.

Once a particular location of the LUT is accessed a data value stored therein is placed on a data bus for output to the marking engine as represented by step 40. Having completed the generation of the enhanced output for the target pixel, the process repeats if additional pixels remain in the input image, as determined by step 42. If all pixels within the input image have been resolution enhanced, the process is complete, step 44.

Figure 14:
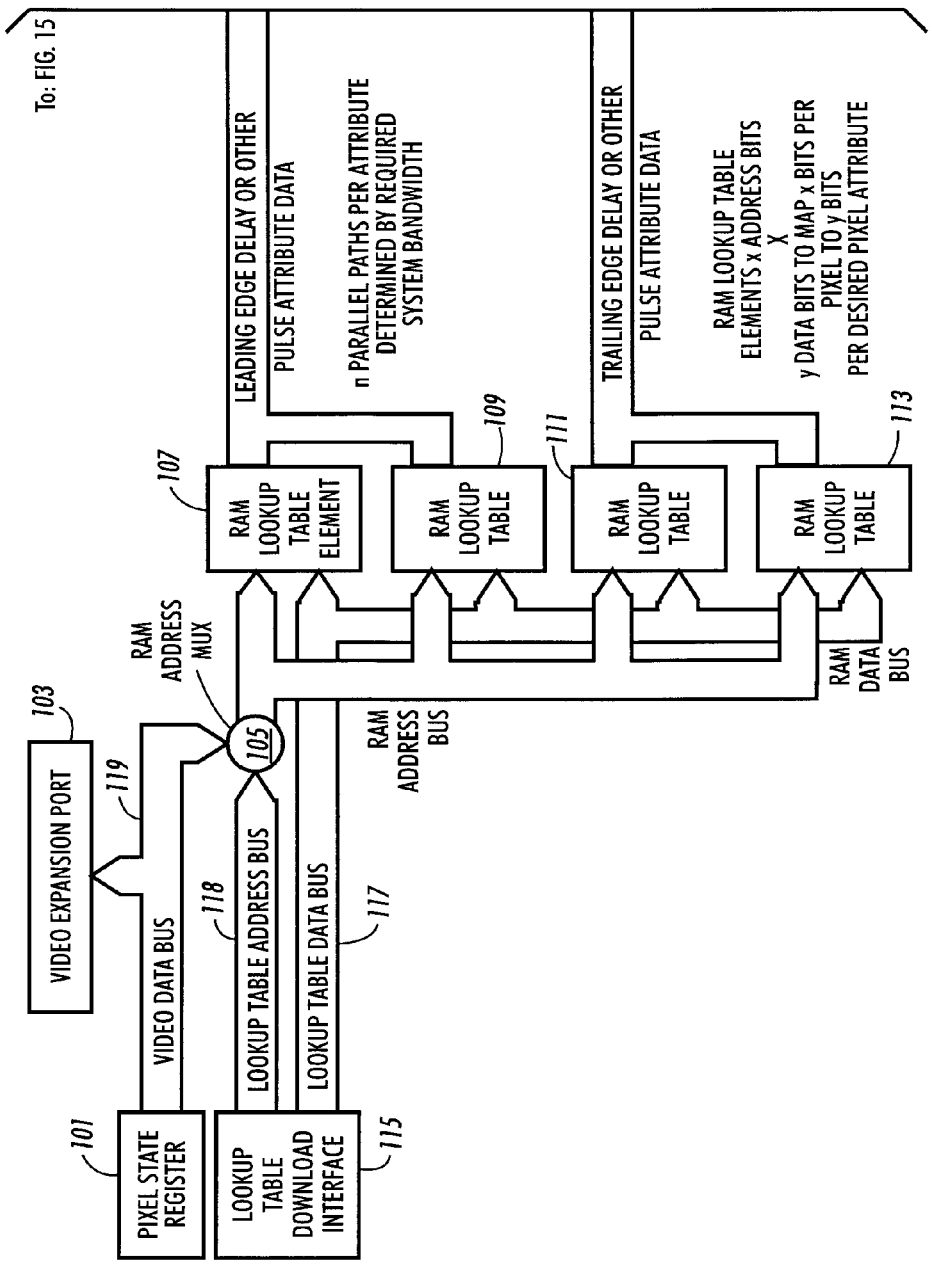
FIGS. 14 and 15 illustrate an architecture for executing the operations of an enhancement filter accordance with the present invention.
Figure 15:
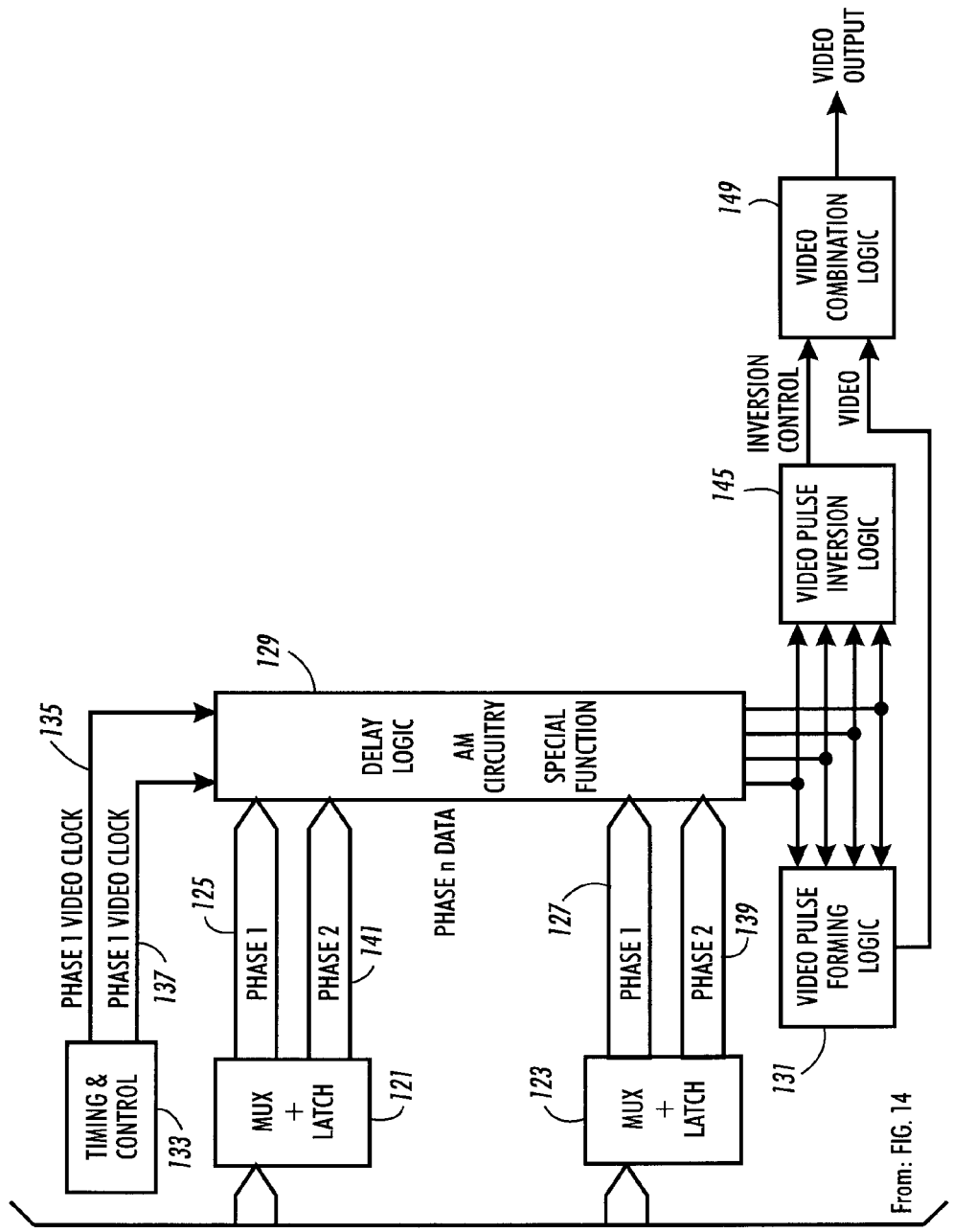

Turning next to FIGS. 14 and 15, an architecture capable of executing the previously described operations of the enhancement filter will now be described. Each pixel is input into the pulse modulator from pixel state register 101 as a series of data words, where the value therein is a function of the pixel states in the observation window associated with the target pixel (step 36 of FIG. 2). The series of data words may be sent through a video expansion port 103 to other pulse modulators (not shown) for parallel processing, such as in the case of color printing where similar processing of the video information is performed for different colors.

The present invention further includes translating means, splitting means, pulse forming means, and generating means. In the pulse modulator of FIGS. 14 and 15, a data word from the series is sent through a RAM address multiplexer 105 to a translating means. As embodied herein, the translating means comprises four random access memory (RAM) look-up tables 107, 109, 111, and 113. Each data word represents an address within the four RAM look-up tables 107, 109, 111, and 113. In a preferred embodiment, a pair of 256×4 ECL RAM look-up tables is used to generate a pulse attribute word for each pulse attribute sought to be controlled. While the invention will be described here using a particular form of pulse generation, it should be noted that this description is merely a preferred embodiment provided for the purpose of illustrating one implementation. Those skilled in the art will recognize that the image may be processed and enhanced signals may be generated using a variety of forms, such as PWPM, high spatial resolution, different quantization (binary to gray-conversion), or switched stated for a binary image, and that the invention is not limited to this embodiment.

Pulse attributes include leading edge delay, trailing edge delay, amplitude of the pulse to be formed, and other special features such as an inverted or multiple pulse per pixel selection. Alternatively, a single 256×8 ECL RAM look-up table may be used to generate each pulse attribute word. The embodiment of FIG. 14 shows two pairs of 256×4 RAM look-up tables 107 and 109, 111 and 113 that correspond to the two pulse attributes of leading edge delay and trailing edge delay. The pulse modulator will accommodate as many pairs of 256×4 RAM look-up tables as there are desired pulse attributes. For example, a third pair of 256×4 RAM look-up tables may be used to control the amplitude of a pulse to be formed. Alternatively, a series of RAM addresses in the look-up tables may be assigned to produce inverted pulses. For example, addresses 64–127 would be decoded so that the pulses produced in response to the data output from those table locations would be inverted. Furthermore, a larger or smaller number of addresses may be used, or allocated, for the production of inverted pulses.

Once an address in each RAM look-up table is accessed by the data word from the pixel state register, each RAM look-up table generates a nibble (4 bits) of information. Thus, each pair of RAM look-up tables generates a pulse attribute word (8 bits) corresponding to the pulse attribute sought to be controlled. While an 8-bit implementation may be preferable, it is not a limitation, and the pulse attribute word may be any number of bits (i.e., 4, 6, 8, 10, 12, etc.).

Characteristic data indicative of the pulse attributes sought to be controlled in a pulse modulator may be downloaded into the RAM look-up tables 107, 109, 111, and 113 from the look-up table download interface 115. Once the look-up table download interface 115 accesses an address of a RAM look-up table, a pulse attribute data nibble may be loaded into the RAM look-up table through the look-up table data bus 117 from the look-up table download interface 115. This allows for different mapping functions in the same pulse modulator for different printing characteristics (i.e., font smoothing, graphics, etc.), and further facilitates maintenance of print quality as the components of the system age.

After the RAM look-up tables 107, 109, 111, and 113 are loaded, the look-up table download interface 115 instructs the RAM address multiplexer 105 to receive data from the video data bus 119.

Figure 16:
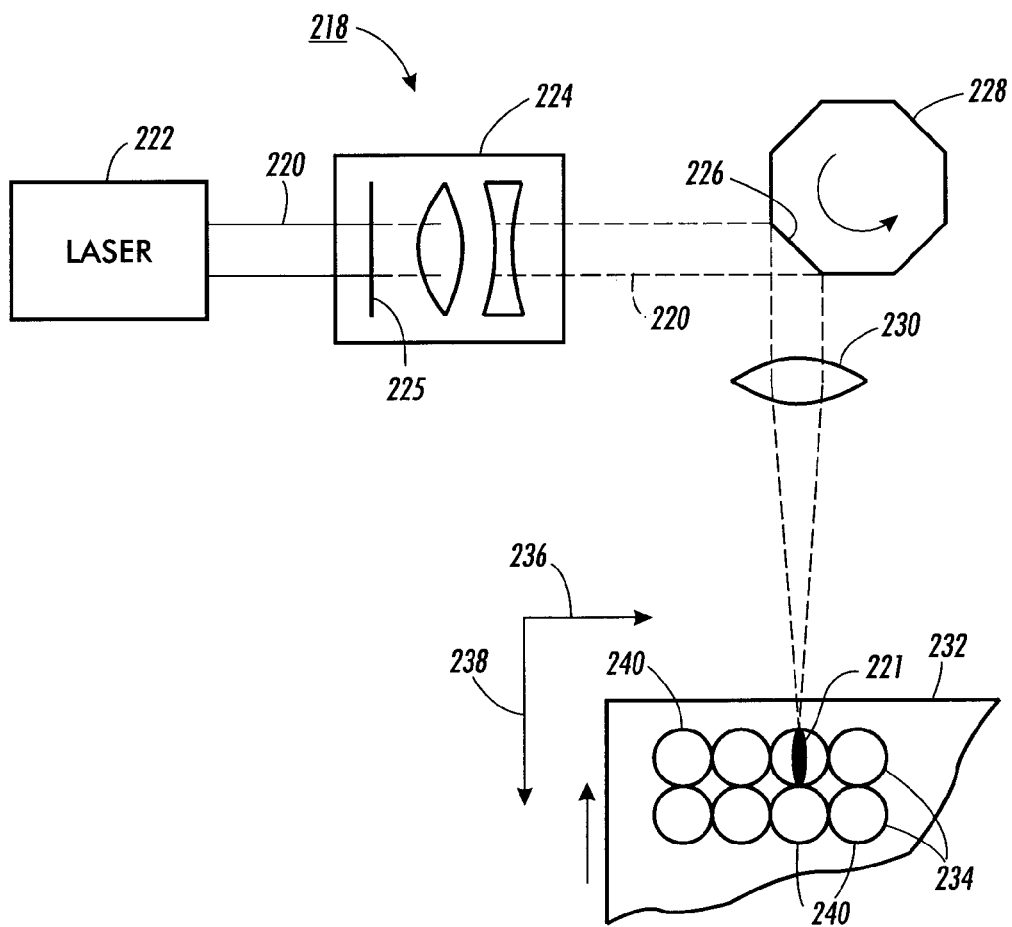
FIG. 16 is a schematic illustration of a Raster Output Scanner (ROS), illustrating a portion of the photosensitive image plane.

In the embodiment of FIG. 14, the four RAM look-up tables 107, 109, 111, and 113 perform the mapping function represented by steps 38 and 40 of FIG. 2, which translates the incoming data word into two pulse attribute words to control the formation of a pulse. In FIG. 16, the top two RAM look-up tables 107 and 109 generate separate nibbles of pulse attribute information that combine to form a pulse attribute word for the leading edge delay of a pulse to be formed. The bottom two RAM look-up tables 111 and 113 generate separate nibbles of pulse attribute information that combine to form a pulse attribute word for the trailing edge delay of a pulse to be formed.

As illustrated in FIG. 15, each pulse attribute word is fed to a respective splitting means that comprises multiplexer and latch blocks 121 and 123. In the preferred embodiment, each respective multiplexer and latch block contains two latches, one for each of the phase 1 and phase 2 buses. The two pulse attribute words generated in the RAM look-up tables 107, 109, 111, and 113 form data words that are latched onto the phase 1 buses by their respective multiplexers 121 and 123 at a leading edge of a pulse from the phase 1 video clock 135.

The two data words latched on their respective phase 1 buses 125 and 127 are further processed on separate channels in a pulse forming means corresponding to each channel. As depicted, the pulse forming means comprises a delay logic block 129 for forming separate leading and trailing edge delayed pulses and a video pulse forming logic block 131. The video pulse forming logic block 131, which comprises the generating means, forms a single pulse from the leading and trailing edge delay pulses. Subsequent to generation of the first or normal pulse in the video pulse forming logic block 131, the pulse may be inverted under the control of the combination logic block 149.

As represented by the embodiment depicted in FIG. 15, video combination logic block 149 allows the video signal from video pulse forming logic block 131 to pass unaltered if a logic zero is present on the inversion control line. On the other hand, at any time the video pulse inversion logic block 145 should produce a logic one on the inversion control line, the video pulse signal output from block 131 will be inverted so as to form a pair of video pulses.

It is noted that the speed of a typical scanning system, with only a single phase video clock and corresponding phased set of buses, is limited by the speed at which its delay and pulse forming logic 129 and 131 can operate on pulse attribute words and then be reset to accept new pulse attribute words. In the embodiment shown in FIG. 15, with only the phase 1 video clock 135 and phase 1 buses 125 and 127, the delay and pulse forming logic blocks 129 and 131 may limit the processing speed of the pulse modulator. Specifically, while the two pulse attribute words corresponding to the first data word are being processed by the delay and pulse forming logic blocks 129 and 131, a second pair of pulse attribute words corresponding to a second data word will already be formed, waiting at the respective multiplexer and latch blocks 121 and 123 to be latched onto the phase 1 buses 125 and 127 and processed by the delay and pulse forming logic 129 and 131.

Referring now to FIG. 16, upon receiving the video output from combination logic block 149 of FIG. 15, a marking engine in the form of a raster output scanner (ROS) 218 may be used to print the video signals of the enhanced bitmap.

There are two common types of ROS 218, flying spot and pulsed imaging. In both, a laser beam 220, emitted from laser 222, passes into conditioning optics 224 that may include a modulator 225. For precise periods of time, determined in response to video signals supplied to ROS 218, modulator 225 either blocks or deflects the laser beam, or allows the beam to pass through the conditioning optics to illuminate a facet 226 of rotating polygon 228. Laser 222 may be a helium-neon laser or a laser diode. In the latter case, the video data could directly modulate the laser rather than modulator 225. In addition, more than a single laser source 222 or beam 220 could be employed to practice the invention.

After reflecting off facet 226, laser beam 220 passes through conditioning optics 230 and forms a spot 221 on photosensitive image plane 232. The rotating facet causes laser spot 221 to scan across the image plane in a line 234. Line 234 lies in what is commonly referred to as the fast scan direction, represented by arrow 236. In addition, as facet 226 rotates, image plane 232 moves in a slow scan direction, substantially perpendicular to the fast scan direction, as represented by arrow 238. Movement in the slow scan direction is such that successive rotating facets of the polygon for successive scan lines 234 that are offset from each other in the slow scan direction. Subsequent to exposure the latent electrostatic image remaining on photosensitive image plane 232 is developed using any commonly known charge sensitive development techniques so as to produce a developed image that is transferable to an output medium.

Each scan line 234 consists of a row of pixels 240, wherein the pixels are produced by the modulation of the laser beam as laser spot 221 scans across the image plane. As beam 220 scans across the scan line, laser spot 221 either illuminates or does not illuminate the individual pixel, in accordance with the video signals provided to ROS. In general, the video signals may be characterized as a serial stream of pulses, where a logic one or a pulse specifies that the beam is to illuminate the surface, while a logic zero, no pulse, will result in no illumination.

For both types of ROS, the width of pixel 240 is dependent upon the period or duration of the corresponding logic one pulse in the video signal supplied to ROS 218. In a scanning spot ROS, at the leading edge of a pulse modulator 225 allows the passage of laser beam 220 onto the image plane. For the duration of the pulse, an oval shaped laser spot 221 is scanned across image plane 232, illuminating at least one addressed pixel 240 within the scan line 234. The width of the illuminated region in the fast scan direction thus depends on the duration of the video pulse, as well as on the width and scanning rate of laser spot 221. Typically, the dimensions of the laser spot are such that it is two to three times wider in the slow scan direction than its width in the fast scan direction. As an example, in a 600 spot per inch, 135 page per minute, dual beam printer, the laser spot at half the maximum intensity is approximately 43 $\mu$m wide in the slow scan direction and 20 $\mu$m wide in the fast scan direction, and the time period required for the spot to scan across the width of a single pixel 240 is about 15 nanoseconds.

Typically, the video data used to drive the ROS is clocked so that the period within which each pixel is exposed, referred to hereafter as a pixel clock period, is the same. In addition, the video data used to generate the video signal pulses that drive the modulator are also synchronized with ROS 218 and the movement of the image plane 232 in the slow scan direction, thereby allowing a particular bit of video data to address an appropriate portion of image plane 232. The synchronization of the video data, the video signal pulses produced therefrom, the ROS and the image plane is achieved through the use of a system clock that is equivalent to the rate at which pixels must be exposed on the image plane. While faster clocks may allow greater resolution within the video pulse stream, a higher frequency also results in increased costs for faster hardware within the video processing path.

In the present embodiment, a pulse-width, position, and amplitude modulator (pulse modulator) is utilized to form the video signal pulses in response to video data representing the image to be printed. It is noted that while the following description is directed toward a single color output, this is for simplicity of description only and there is no intent to limit the application of the present invention in such a manner.

It is, therefore, apparent that there has been provided, in accordance with the present invention, a method and apparatus for improving the appearance of printed documents. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of reducing a number of entries stored in a look-up table, comprising:
   identifying a look-up table having look up table entries associated with multiple output signals;
   examining said look-up table entries and said output signals, to identify said look-up table entries that possess similarity via a rotation of corresponding template patterns about an angle in a multi-dimensional space; and
   reducing a number of output signals that will be generated based upon similarities between said identified look-up table entries and similarities in said output signals.

2. A method of reducing a number of entries stored in a look-up table as claimed in claim 1 further comprising identifying multiple symmetries of a template pattern stored in the look-up table at different rotation angles and generating a single output signal for said multiple pattern symmetries.

3. A method of reducing a number of entries stored in a look-up table as claimed in claim 1 further comprising identifying output signals that differ only by a rotation angle at which they will be generated and associating all look-up table entries associated with said identified output signals with a single output signal.

4. A method of reducing a number look-up tables, wherein each of said look-up tables includes a plurality of entries, each entry being associated with an output signal, the method comprising:
   examining said look-up table entries and said associated output signals to identify said look-up table entries that possess similarity via a rotation of corresponding template patterns about an angle in a multi-dimensional space, and
   reducing a number of look-up tables based upon similarities between said identified look-up table entries and similarities between said associated output signals.

5. A method of reducing a number of look-up tables as claimed in claim 4 further comprising identifying multiple symmetries of a pattern stored in said plurality of look-up tables and generating a single output signal to be associated with each of said multiple pattern symmetries.

6. A method of reducing a number of entries stored in a look-up table as claimed in claim 4 further comprising identifying output signals that differ only by a rotation angle at which they will be generated and associating all look-up table entries in said plurality of look-up tables that are associated with said identified output signals with a single output signal.

7. The method according to claim 4, wherein the rotation of corresponding template patterns about an angle in a multi-dimensional space comprises at least one of a flip horizontal, flip vertical, flip right diagonal or flip left diagonal symmetry operation.

8. A symmetry reduction method for reducing a number of entries stored in a look-up table, comprising:
   examining said look-up table entries, to identify a group of said look-up table entries that possess similarity via a rotation of corresponding template patterns about an angle in a multi-dimensional space;
   reducing said corresponding template patterns to a common symmetry; and
   replacing said group of said look-up table entries with a single entry based upon the common symmetry.

9. The method according to claim 8, wherein the common symmetry is a least common symmetry.

10. The method according to claim 8, wherein the common symmetry is the greatest common symmetry.

11. The method according to claim 8, wherein each of said look-up table entries comprises a vector representation of the corresponding template pattern and the step of reducing said corresponding template patterns to a common symmetry, comprises:
    determining a plurality of vector values from said vector representation; and
    comparing said plurality of vector values to identify said common symmetry.

12. The method according to claim 11, wherein the step of determining a plurality of vector values, comprises:
    separating said vector representation into a plurality of individual bits;
    using selected ones of said plurality of individual bits to index to a symmetry operation look-up table, said symmetry option look-up table having an output value associated with each index; and,
    summing the output values from the look-up table.

13. The method according to claim 8, wherein the rotation of corresponding template patterns about an angle in a multi-dimensional space comprises at least one of a flip horizontal, flip vertical, flip right diagonal or flip left diagonal symmetry operation.

14. A symmetry reduction method for reducing a number of entries stored in a look-up table wherein each of said look-up table entries comprises a vector representation of a template pattern, comprising:
    examining said look-up table entries, to identify a group of said look-up table entries that possess similarity via a rotation of corresponding template patterns about an angle in multi-dimensional space;
    reducing said corresponding template patterns to a common symmetry, said step of reducing including determining a plurality of vector values from said vector representation and comparing said plurality of vector values to identify said common symmetry; and
    replacing said group of said look-up table entries with a single entry based upon the common symmetry.

15. The method according to claim 14, wherein the common symmetry is a least common symmetry.

16. The method according to claim 14, wherein the common symmetry is the greatest common symmetry.

17. The method according to claim 14, wherein the step of determining a plurality of vector values, comprises:

separating said vector representation into a plurality of individual bits;

using selected ones of said plurality of individual bits to index to a symmetry operation look-up table, said symmetry option look-up table having an output value associated with each index; and;

summing the output values from the look-up table.

* * * * *